United States Patent [19]

Iwasa et al.

[11] Patent Number: 5,565,117
[45] Date of Patent: Oct. 15, 1996

[54] METHOD OF RESISTANCE-WELDING WORKPIECES OF METAL AND RESISTANCE-WELDED WELDMENT OF METAL

[75] Inventors: Takashi Iwasa; Shinji Okabe; Takushi Irie, all of Saitama; Yuichi Furukawa; Ichiro Iwai, both of Osaka, all of Japan

[73] Assignees: Honda Giken Kogyo Kabushiki Kaisha, Tokyo; Showa Aluminum Corporation, Osaka, both of Japan

[21] Appl. No.: 364,632

[22] Filed: Dec. 27, 1994

[30] Foreign Application Priority Data

Dec. 27, 1993 [JP] Japan .................... 5-348402

[51] Int. Cl.⁶ ................ B23K 11/11; B23K 11/18
[52] U.S. Cl. ............. 219/117.1; 219/85.14; 219/85.15
[58] Field of Search ............... 219/85.14, 85.15, 219/117.1, 118

[56] References Cited

U.S. PATENT DOCUMENTS

| | | |
|---|---|---|
| 3,726,727 | 4/1973 | Ishibashi et al. . |
| 4,005,741 | 2/1977 | Juganson et al. .............. 164/54 |
| 5,145,106 | 9/1992 | Moore et al. .............. 228/241 |

FOREIGN PATENT DOCUMENTS

| | | |
|---|---|---|
| 539670A2 | 8/1992 | European Pat. Off. . |
| 2105531 | 1/1972 | Germany . |
| 54-41550 | 12/1979 | Japan . |
| 59-26392 | 6/1984 | Japan . |
| 59-26393 | 6/1984 | Japan . |
| 63-278679 | 11/1988 | Japan . |
| 4-210455 | 7/1992 | Japan . |
| 5-185245 | 7/1993 | Japan ................. 219/118 |
| 269236 | 10/1950 | Switzerland . |

Primary Examiner—Teresa J. Walberg
Assistant Examiner—J. Pelham
Attorney, Agent, or Firm—Lyon & Lyon

[57] ABSTRACT

Workpieces of aluminum alloy are resistance-welded while a powdery mixture of magnesium and a metal oxide is being interposed between regions of workpieces of aluminum alloy which are to be joined to each other. The metal oxide may comprise at least one material selected from the group consisting of $TiO_2$, $SiO_2$, $Cr_2O_3$, $MnO_2$, $Fe_2O_3$, CuO, and $Ti_2O_3$ and the powdery mixture may include aluminum powder. The workpieces may be made of aluminum, stainless steel, or the like rather than aluminum alloy.

10 Claims, 2 Drawing Sheets

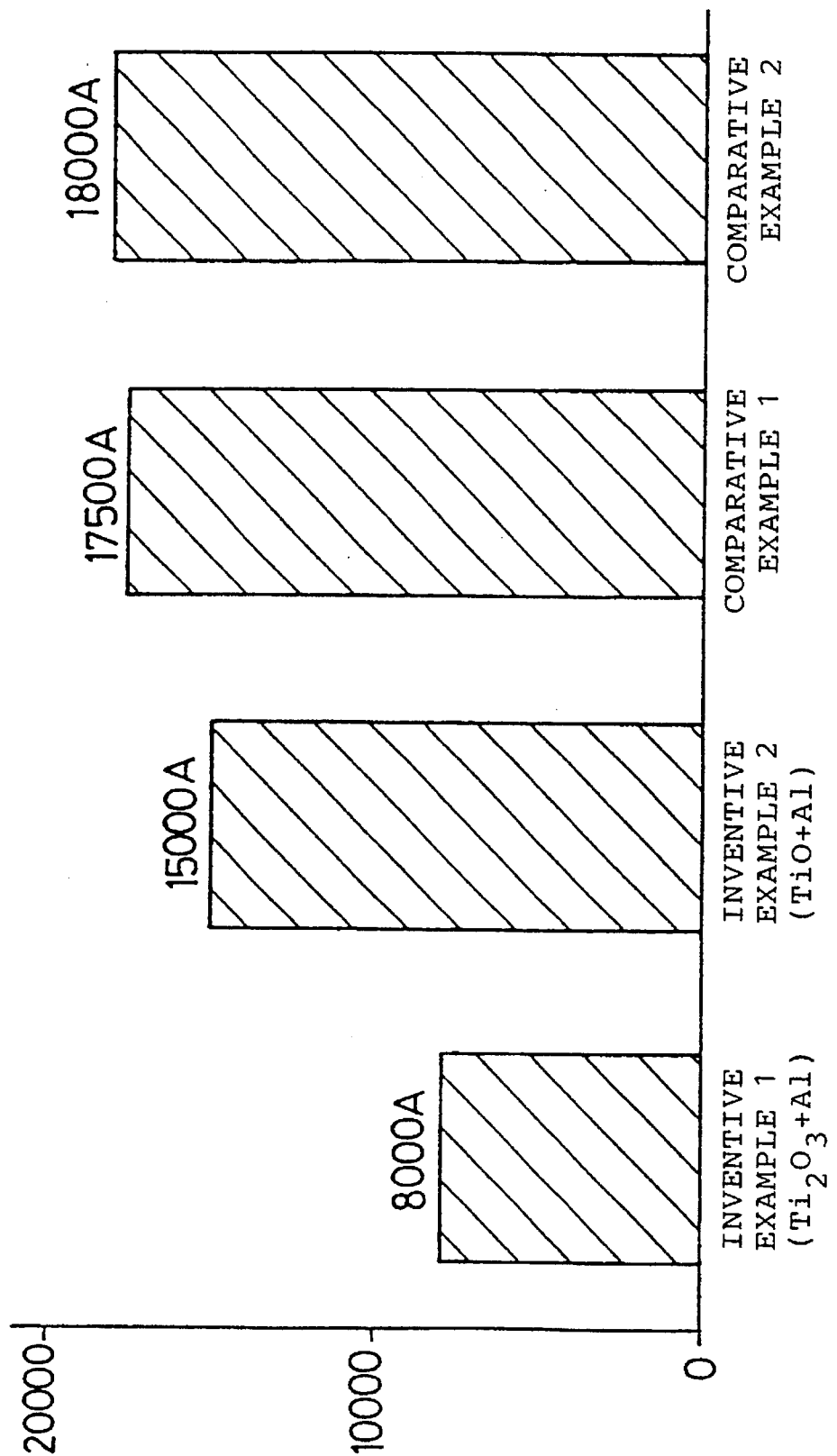

METHOD OF RESISTANCE-WELDING WORKPIECES OF METAL AND RESISTANCE-WELDED WELDMENT OF METAL

BACKGROUND OF THE INVENTION

1. Field of the Invention

The present invention relates to a method of resistance-welding workpieces of metal, especially workpieces of aluminum alloy, and a weldment which is resistance-welded by such a method.

2. Description of the Prior Art

Aluminum alloys (including aluminum) are widely used as components in aircraft, vehicles, etc. as they are highly resistant to corrosion and have good machinability. If workpieces of aluminum alloy are to be spot-welded, a large electric current needs to be supplied to the workpieces of aluminum alloy in a short period of time because the aluminum alloy has small electric resistance and large thermal conductivity. When a large electric current is supplied to the workpieces of aluminum alloy, however, electrode tips tend to be fused with the workpieces of aluminum alloy.

It has been proposed to interpose a thin film of zinc between workpieces of aluminum alloy as disclosed in Japanese patent publication No. 54-41550. According to this publication, the thin film of zinc is interposed between regions of aluminum plates which are to be resistance-welded, and then instantaneously melted in a resistance welding process to produce a high-resistance area to concentrate electric energy thereon.

Japanese patent publication No. 59-26392 discloses a thin layer of titanium, rather than a thin film of zinc, to be interposed between aluminum workpieces to be welded, and Japanese patent publication No. 59-26393 discloses a thin sheet of stainless steel, rather than a thin film of zinc, to be interposed between aluminum workpieces to be welded. Placing an aluminum alloy having a higher electric resistance than workpieces of aluminum which are to be welded between those workpieces is disclosed in Japanese laid-open patent publication No. 63-278679.

The thin film of zinc, the thin layer of titanium, the thin sheet of stainless steel, and the high-electric-resistance aluminum alloy are effective to increase the electric resistance of a local area of the aluminum workpieces, but are ineffective to lower the electric current that is necessary to be supplied to the aluminum workpieces because all the heat required to weld the aluminum workpieces is generated as Joule heat.

Among various demands in recent years is to increase a welded area with a constant electric current supplied to workpieces that are to be resistance-welded. However, such a demand cannot be met by the above conventional welding processes because they need an increased electric current to be supplied to produce an increased welded area.

Resistance-welding of workpieces made of aluminum, stainless steel, or other metals, rather than aluminum alloy, also requires the welding current to be lowered as with the resistance-welding of workpieces of aluminum alloy.

SUMMARY OF THE INVENTION

It is therefore an object of the present invention to provide a method of resistance-welding workpieces of aluminum alloy with reduced Joule heat, a lowered melting point, and a reduced welding current to produce a welded region having an increased mechanical strength.

Another object of the present invention is to provide a weldment of aluminum alloy which is resistance-welded by such a method.

The principles of the present invention are based on positive utilization of the heat produced by a thermite reaction and a reduction in the melting point by an eutectic.

According to the present invention, there is provided a method of resistance-welding metal workpieces, comprising the step of interposing a powdery mixture composed of a metal powder and a metal oxide powder for developing a thermite reaction due to contact resistance produced from an electric current passing therethrough, between metal workpieces which are to be joined to each other, and supplying a welding current through the metal workpieces and the powdery mixture. The powdery mixture produces an amount of heat Q which is equal to or higher than 100 cal/g in the thermite reaction. The metal powder comprises at least one material selected from the group consisting of aluminum, magnesium, zinc, titanium, and silicon. The metal oxide powder comprises at least one material selected from the group consisting of $SiO_2$, $Cr_2O_3$, $TiO_2$, $MnO_2$, $Fe_2O_3$, CuO, and $Ti_2O_3$.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4 is a graph showing welding currents supplied to obtain necessary nugget diameters "d" of 5.5 mm prescribed by JIS (Japan Industrial Standards), Class A, in Experimental Examples according to the first embodiment and Comparative Examples.

DETAILED DESCRIPTION OF THE PREFERRED EMBODIMENT

A resistant welding method according to a first embodiment of the present invention will be described below with reference to FIGS. 1 through 4.

If a powdery mixture contains a metal oxide of MeO, then when an electric current passes through the mixed power, the powdery mixture causes a thermite reaction represented by $3MeO+2Al \rightarrow Al_2O_3+3Me+q$ (heat of reaction) due to a contact resistance. The inventors conducted various experiments in order to lower an electric current required by a process of resistance-welding metal workpieces by sufficiently increasing the heating efficiency of welded regions based on the heat produced by such a thermite reaction and the resistance heating caused by a contact resistance between the metal workpieces and the powdery mixture.

Two rolled sheets made of an Al-Mg alloy (A5182-O material) were selected as workpieces to be spot-welded. Each of the rolled sheets had a thickness of 1.2 mm, and had a low specific resistance of 5.2 μΩcm at room temperature.

0.06 g of aluminum powder having an average particle diameter of 150 μm or less and 0.14 g of a metal oxide powder, i.e., $Ti_2O_3$, having an average particle diameter of 5 μm or less were mixed with each other for use as a first powdery mixture.

Figure 1:
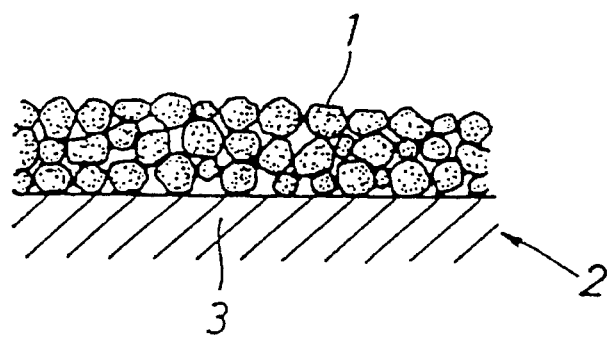
FIG. 1 is an enlarged fragmentary cross sectional view showing a first powdery mixture spread over a rolled sheet in a resistance welding method according to a first embodiment of the present invention.
Figure 2:
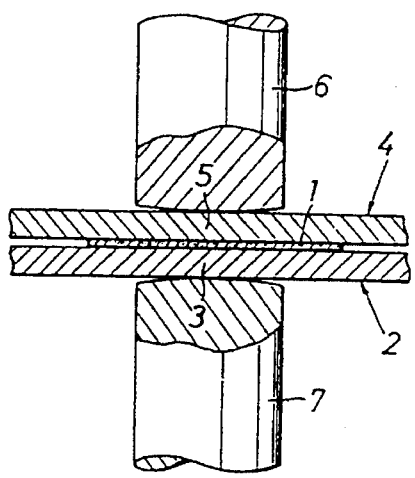
FIG. 2 is a fragmentary cross sectional view showing the manner in which metal workpieces start being spot-welded in the resistance welding method according to the first embodiment of the present invention.
Figure 3:
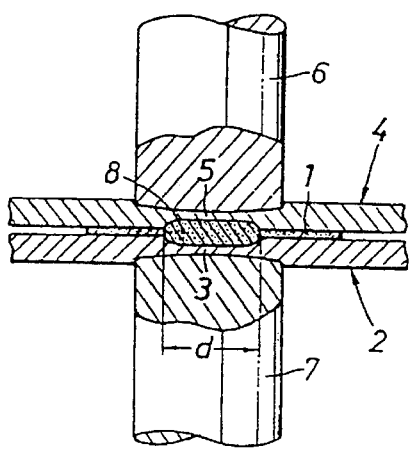
FIG. 3 is a fragmentary cross sectional view of the spot-welded metal workpieces at the time the spot-welding process is finished.

As shown in FIG. 1, the first powdery mixture, denoted by 1, was spread to a thickness of 0.8 mm over the surface of a welding region 3 of one of the rolled sheets, denoted by 2. Then, as shown in FIG. 2, the two rolled sheets, denoted by 2, 4, respectively, were superposed on each other with the first powdery mixture 1 interposed between their respective welding regions 3, 5. Thereafter, the welding regions 3, 5 were pressed against each other under a pressure of 430 kgf by and between a pair of electrode tips 6, 7 each having an outside diameter of 19 mm and a round tip end whose radius of curvature is 80 mm. At the same time, a welding current supplied from a single-phase rectified power supply was passed between the electrode tips 6, 7 in four cycles thereby spot-welding the welding regions 3, 5 to each other through a nugget 8 interposed therebetween as shown in FIG. 3.

Due to the contact resistance, the first powdery mixture 1 generated heat of reaction due to a thermite reaction represented by $Ti_2O_3+2Al \rightarrow Al_2O_3+2Ti+35.4$ kcal., and the generated amount of heat Q was Q=178 cal/g. It was found that the heating efficiency of the welding regions 3, 5 could be sufficiently increased by combining the heat of reaction and the resistance heating caused by the contact resistance between the welding regions 3, 5 and the first powdery mixture 1. The above example will be referred to as Inventive Example 1.

0.1 g of aluminum powder having an average particle diameter of 150 μm or less and 0.1 g of TiO having an average particle diameter of 5 μm or less were mixed with each other for use as a second powdery mixture.

Welding regions 3, 5 of two rolled sheets 2, 4 were spot-welded with the second powdery mixture interposed therebetween under the same conditions as described above in Inventive Example 1.

Due to the contact resistance, the second powdery mixture generated heat of reaction due to a thermite reaction represented by $3TiO+2Al \rightarrow Al_2O_3+3Ti+23.2$ kcal., and the generated amount of heat Q was Q=94 cal/g. This example will be referred to as Inventive Example 2.

In Comparative Example 1 which corresponds to a conventional process, an aluminum alloy foil having a high electric resistance was interposed between welding regions 3, 5 of two rolled sheets 2, 4, and they were spot-welded under the same conditions as described above in Inventive Example 1. The foil was made of $Al_{99.3}Mn_{0.7}$ (the numerals indicate atomic %), had a thickness of 48 μm, a width of 15 mm, a length of 30 mm, and a specific resistance of 7.1 μΩcm at room temperature. This specific resistance was higher than the specific resistance of 5.2 μΩcm of the rolled sheets 2, 4.

Welding regions 3, 5 of two rolled sheets 2, 4 were spot-welded with nothing interposed therebetween, and they were spot-welded under the same conditions as described above in Inventive Example 1. This example will be referred to as Comparative Example 2.

FIG. 4 shows welding currents supplied to obtain necessary nugget diameters "d" of 5.5 mm prescribed by JIS (Japan Industrial Standards), Class A, in Inventive Examples 1, 2 according to the first embodiment and Comparative Examples 1, 2.

It can be seen from FIG. 4 that the welding current needed in Inventive Example 1 was 8000 Å and the welding current needed in Inventive Example 2 was 15000 Å, whereas the welding currents needed in Comparative Examples 1, 2 were 17500 Å and 18000 Å, respectively. Accordingly, Inventive Examples 1, 2 required lower electric currents as welding currents than Comparative Examples 1, 2.

The welding current in Inventive Example 1 is much lower than the welding current in Inventive Example 2. This is because the amount of heat Q generated by the first powdery mixture is greater than the amount of heat Q generated by the second powdery mixture. Various experiments were carried out to determine an amount of heat Q which is required to achieve a welding current which is as low as with Inventive Example 1. As a result, it was found that the required amount of heat Q was equal to or greater than 100 cal/g (Q>100 cal/g).

Other powdery mixtures capable of generating such an amount of heat Q, their thermite reactions, and their generated amounts of heat Q are given in Table below:

TABLE

| Thermit reactions of powdery mixtures | Amount of heat Q (cal/g) |
|---|---|
| $\frac{2}{3}SiO_2 + 2Al \rightarrow Al_2O_3 + \frac{2}{3}Si + 71$ kcal. | 493 |
| $Cr_2O_3 + 2Al \rightarrow Al_2O_3 + 2Cr + 125$ kcal. | 609 |
| $\frac{3}{2}TiO_2 + 2Al \rightarrow Al_2O_3 + \frac{3}{2}Ti + 59$ kcal. | 340 |
| $\frac{3}{2}MnO_2 + 2Al \rightarrow Al_2O_3 + \frac{3}{2}Mn + 212$ kcal. | 1147 |
| $Fe_2O_3 + 2Al \rightarrow Al_2O_3 + 2Fe + 201$ kcal. | 940 |
| $3CuO + 2Al \rightarrow Al_2O_3 + 3Cu + 285$ kcal. | 975 |
| $MnO_2 + Zr \rightarrow ZrO_2 + Mn + 137.9$ kcal. | 774 |
| $MnO_2 + Ti \rightarrow TiO_2 + Mn + 101.4$ kcal. | 752 |
| $MnO_2 + Si \rightarrow SiO_2 + Mn + 93.4$ kcal. | 811 |
| $\frac{1}{2}MnO_2 + Mg \rightarrow MgO + \frac{1}{2}Mn + 80.4$ kcal. | 1186 |

If metal powders other than the Al, Mg powders are used, then the combined amount of generated heat is greater than the values indicated above because metal oxides of $ZrO_2$, $TiO_2$, $SiO_2$ generated in the above thermite reactions cause a secondary thermite reaction with the aluminum of the workpieces to be welded.

Zr, Ti, Si, and Cr generated by the reactions are effective to produce a fine structure in a matrix of aluminum, and hence they can strengthen the nuggets.

In the first embodiment, it is possible to further reduce the welding current by reducing the diameter of the electrode tips 6, 7 for a higher current density. Furthermore, the principles of the first embodiment are applicable to a process of resistance-welding metal workpieces made of aluminum, stainless steel, or the like, and such a resistance-welding process includes a seam welding process.

According to the first embodiment, as described above, a welding current required in a process of resistance-welding metal workpieces can be lowered by utilizing a thermite reaction as well as resistance heating, and the reduced welding current allows the positive and negative electrodes used to have a longer service life and results in a reduction in the cost of welding equipment used.

As a result of the inventors' study of various welding processes, it has been found that since magnesium is eutectic with respect to aluminum, when an electric current is supplied to workpieces of aluminum with magnesium interposed therebetween, the aluminum and magnesium can melt at the eutectic point into an aluminum—magnesium alloy of large electric resistance with a relatively low electric current, that when a metal oxide is added other than magnesium, the metal oxide reacts with aluminum or magnesium in a violent exothermic reaction called a thermite reaction while the aluminum and magnesium are melting at the eutectic point, resulting in a sharp increase in the temperature of the melted region and an increase in the area of the welded joint, and that the mechanical strength of the welded joint is increased by a solid solution of aluminum and magnesium where up to 17 weight % of magnesium can be included.

Specifically, in a process of resistance-welding workpieces of aluminum alloy, a powdery mixture of magnesium and a metal oxide is interposed between regions of the workpieces of aluminum alloy which are to be joined to each other. The metal oxide is at least one selected from the group consisting of $TiO_2$, $SiO_2$, $Cr_2O_3$, and $MnO_2$, for example. Aluminum powder may be added to the powdery mixture.

If the metal oxide is $TiO_2$, $SiO_2$, $Cr_2O_3$, or $MnO_2$, then Ti, Cr, or Mn is generated in a thermite reaction, and the generated element is effective to suppress crystallization of $Al_3Mg_2$ which is one of the factors that tend to reduce the mechanical strength of the welded joint. As a result, the mechanical strength of the welded joint is allowed to increase.

The added aluminum powder cooperates with the magnesium powder in accelerating the eutectic reaction.

EXPERIMENTAL EXAMPLES including Inventive Examples according to a second embodiment of the present invention and Comparative Examples according to the conventional welding process are given below. The present invention is however not limited to these Inventive Examples.

EXPERIMENTAL EXAMPLES 1~8 (Inventive Examples 3~8, Comparative Examples 3, 4):
Workpieces to be welded (base material):
  Material: Rolled Al - Mg aluminum alloy (A5182)
  Thickness: 1.2 mm
Welding conditions:
  Power supply: Inverter power supply
  Current: 12 kA (Experimental examples 1~7) 10 kA (Experimental example 8)
  Pressure: 400 kgf
Powdery mixture:
  Coated amount: 0.1 g per 400 mm² (e.g., 20 mm×20 mm)
  Composition: Mixture of magnesium powder (particle diameter of 300 μm or less) and metal oxide powder (particle diameter of 5 μm or less), or mixture of magnesium powder (particle diameter of 300 μm or less), metal oxide powder (particle diameter of 5 μm or less), and aluminum powder (particle diameter of 150 μm or less).

The composition of the powdery mixture was varied in Inventive Examples 3~8, with no powdery mixture contained in Comparative Examples 3, 4. The workpieces were spot-welded, and the tensile shear loads were checked. The results are given in Table 1 below. The tensile shear load is a tensile load applied to the joined surfaces when they are torn apart under shear stresses caused by the tensile load.

TABLE 1

| Experimental Examples | Workpiece Material | Powdery mixture Composition | Amount | (A) kgf | Welding conditions |
|---|---|---|---|---|---|
| In. Ex. 3 | A5182 | 20 wt % $TiO_2$—Mg | 0.1 g/ 400 mm² | 218 | 12kA,16cy. |

TABLE 1-continued

| Experimental Examples | Workpiece Material | Powdery mixture Composition | Amount | (A) kgf | Welding conditions |
|---|---|---|---|---|---|
| In. Ex. 4 | A5182 | 20 wt % $TiO_2$— 10 wt % Mg—Al | 0.1 g/ 400 mm² | 284 | 12kA,16cy. |
| In. Ex. 5 | A5182 | 60 wt % $Cr_2O_3$—Mg | 0.1 g/ 400 mm² | 263 | 12kA,16cy. |
| In. Ex. 6 | A5182 | 10 wt % $MnO_2$—Mg | 0.1 g/ 400 mm² | 240 | 12kA,16cy. |
| In. Ex. 7 | A5182 | 20 wt % $SiO_2$—Mg | 0.1 g/ 400 mm² | 205 | 12kA,16cy. |
| In. Ex. 8 | A5182 | 20 wt % $SiO_2$— 10 wt % Mg—Al | 0.1 g/ 400 mm² | 268 | 12kA,16cy. |
| Co. Ex. 3 | A5182 | None | | 150 | 12kA,16cy. |
| Co. Ex. 4 | A5182 | None | | 202 | 18kA,16cy. |

(A): Tensile shear load

It can be seen from Table 1 above that the tensile shear load in Comparative Example 3 was 150 kgf, the tensile shear load in Inventive Examples 3, 5, 6, 7 with magnesium powder added exceeded 200 kgf, and the tensile shear load in Inventive Examples 4, 8 with aluminum powder added exceeded 250 kgf.

If the tensile shear load were to be increased in the conventional welding process, then the welding current would have to be increased as in Comparative Example 4. However, the increased welding current would not be preferable as it would fail to achieve the object of the present invention.

As described above, according to the present invention, in resistance-welding workpieces of aluminum alloy, a powdery mixture of magnesium and a metal oxide is interposed between regions of the workpieces of aluminum alloy which are to be joined to each other. The temperature of the melted region is sharply increased by a thermite reaction, and, as a result, the area of the welded joint is increased.

Furthermore, inasmuch as magnesium is eutectic with respect to aluminum, when an electric current is supplied to workpieces of aluminum with magnesium interposed therebetween, the aluminum and magnesium can melt at the eutectic point into an aluminum—magnesium alloy with a relatively low electric current. Because the aluminum—magnesium alloy is of large electric resistance, the Joule heat produced by the welding process can be reduced, and the welding current which is required to be supplied can also be reduced.

Up to 17 wt % of magnesium can be included in a solid solution with aluminum. The mechanical strength of the welded joint is increased by the magnesium in the solid solution.

If the metal oxide is $TiO_2$, $SiO_2$, $Cr_2O_3$, or $MnO_2$, then Ti, Si, Cr, or Mn is generated in a thermite reaction, and the generated element is effective to suppress crystallization of $Al_3Mg_2$ which is one of the factors that tend to reduce the mechanical strength of the welded joint. As a result, the mechanical strength of the welded joint is allowed to increase.

When aluminum powder is added to the powdery mixture of magnesium and a metal oxide, the added aluminum powder cooperates with the magnesium powder in accelerating the eutectic reaction.

The welding process according to the second embodiment of the present invention thus allows workpieces of aluminum alloy to be welded efficiently. Since the supplied welding current is relatively small, the electrode tips and the workpieces are prevented from being fused with each other.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A method of resistance-welding metal workpieces, comprising the step of:

interposing a powdery mixture composed of a metal powder and a metal oxide powder for developing a thermite reaction due to contact resistance produced by electric current passing therethrough, between metal workpieces which are to be joined to each other; and supplying a welding current through said metal workpieces and said powdery mixture.

2. A method according to claim 1, wherein said powdery mixture produces an amount of heat Q which is equal to or higher than 100 cal/g in the thermite reaction.

3. A method according to claim 1, wherein said metal powder comprises at least one material selected from the group consisting of aluminum, magnesium, zinc, titanium, and silicon.

4. A method according to claim 1, wherein said metal oxide powder comprises at least one material selected from the group consisting of $SiO_2$, $Cr_2O_3$, $TiO_2$, $MnO_2$, $Fe_2O_3$, $CuO$, and $Ti_2O_3$.

5. A method according to claim 1, wherein said metal workpieces are made of an aluminum-base metallic material.

6. A method according to claim 1, wherein said metal workpieces are made of an aluminum alloy.

7. A method according to claim 1, wherein said powdery mixture contains aluminum powder and magnesium powder.

8. A resistance-welded weldment of metal comprising:

workpieces of metal which are resistance-welded to each other with a powdery mixture of magnesium and a metal oxide interposed between joined regions of the workpieces.

9. A resistance-welded weldment according to claim 8, wherein said metal oxide comprises at least one material selected from the group consisting of $TiO_2$, $SiO_2$, $Cr_2O_3$, $MnO_2$, $CuO$, and $Ti_2O_3$.

10. A resistance-welded weldment according to claim 8, wherein said powdery mixture contains aluminum powder.

* * * * *